J. A. BOWDEN.
TIRE VALVE.
APPLICATION FILED FEB. 19, 1913.
1,214,004.
Patented Jan. 30, 1917.
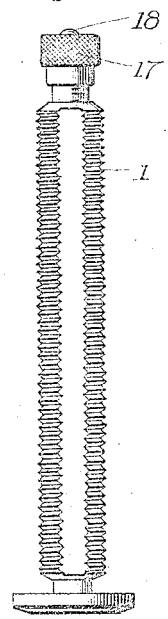
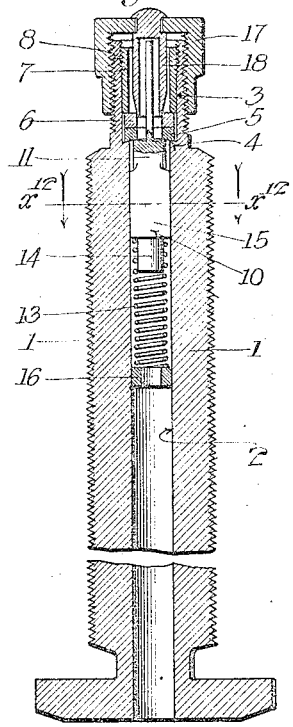
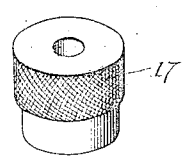
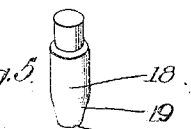
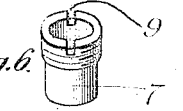
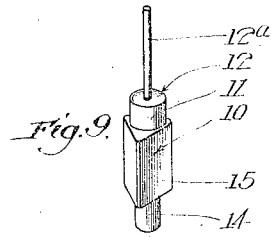
Witnesses:
Inventor:
Junius A. Bowden,

UNITED STATES PATENT OFFICE.

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

TIRE-VALVE.

1,214,004.  Specification of Letters Patent.  Patented Jan. 30, 1917.

Application filed February 19, 1913. Serial No. 749,548.

*To all whom it may concern:*

Be it known that I, JUNIUS A. BOWDEN, a citizen of the United States, residing at Los Angeles, in the county of Los Angeles and State of California, have invented a new and useful Tire-Valve, of which the following is a specification.

This invention relates to valves for pneumatic tires, and particularly to that type in which all parts of the valve are movable from the outer end of the valve body.

One object of the invention is to provide for securing an airtight closure between the removable cap and the valve body at a point within the valve body near the outer end thereof.

Another object is to so construct the valve that it will instantly and automatically open when an air gage of the pocket type is pressed against the end of the valve, and thereby afford communication between the interior of the tire and the gage, enabling air to pass from the tire to the gage.

Another object is to provide means for securing the packing of the valve at a predetermined tension and avoid any excessive expansion and reduction of the air passage which would otherwise occur.

Another object is to provide an inexpensive and positive means for automatically guiding the valve plunger.

Another object is to provide a larger air passage than in the present standard tire valve body in universal use.

A further object is to provide a separable part which is held by frictional contact with the inner wall of the valve body and forms a seat for the inner end of the valve spring, whereby a considerable advantage in manufacture is secured.

Another important object is to employ the present standard size of valve body now in universal use and so construct the internal valve mechanism that a larger air passage in the space given is obtained, without sacrificing any advantages or necessary features in valves now in successful use.

Referring to the drawings: Figure 1 is a side elevation showing the exterior appearance of the valve. Fig. 2 is a longitudinal section through the valve, the body having been contracted in length. Fig. 3 is a side elevation of the inner valve mechanism removed. Fig. 4 is a perspective of the external cap with hollow pin removed. Fig. 5 is a perspective of the hollow cap pin. Fig. 6 is a perspective of the seat retainer. Fig. 7 is a perspective of the fiber portion of the removable seat. Fig. 8 is a perspective of the rubber portion of the removable seat. Fig. 9 is a perspective of the valve plunger. Fig. 10 is a perspective of the spring. Fig. 11 is a perspective of the spring seat. Fig. 12 is a section on line $x^{12}$—$x^{12}$, Fig. 2.

The valve body 1 is externally of the usual construction and dimensions, and internally is provided with an airtight conduit 2 which extends from the inner end of the body to a point near the outer end thereof, the outer portion of the valve body having an enlarged bore 3 forming a guttered shoulder 4 which presents a slightly raised inner edge upon which a removable yielding valve seat 5 rests, and is firmly held in airtight engagement therewith by a superposed seat member 6 formed preferably of fiber, the latter being held in place by a seat retainer, comprising a sleeve 7, the upper portion of which is threaded and screwed upon internal threads 8 formed in the upper portion only of the reduced outer end of the valve body, the threads 8 extending a definite distance to act as a positive stop for the sleeve 7, preventing the latter from being inserted farther than the exact point required to place the rubber seat 5 under the proper pressure to give a perfect airtight engagement with the shoulder 4. This insures that whenever the valve is replaced that the seat 5 will never be under excessive pressure. The upper edge of the seat retainer 7 is slotted at 9 to enable it to be easily screwed into or out of position by a screw driver.

The valve plunger 10 slides in the air conduit 2 below the seat 5 and has an upper cupped portion 11 presenting a thin edge 12 which is yieldingly held against the rubber seat 5 by a spring 13, the tension of which is sufficient to cause the edge 12 to slightly indent the rubber 5 sufficiently to form a perfect airtight closure without additional means except the air pressure in the tire against the plunger. A pin $12^a$ is driven into the valve plunger 10 and becomes a permanent part thereof. This pin projects to a point substantially flush with the outer end of the valve body and enables the valve to be automatically opened by pressing a pocket tire gage on the outer end of the valve body and thus causing the gage to indicate the pounds pressure in the tire, and by removal of the gage the valve automatically closes. By simply pressing on the end of this pin the tire may be deflated or the valve may be opened automatically by a hose connection.

The upper end of the spring 13 encircles and grips a boss 14 on the lower end of the valve plunger and the intermediate portion 15 of the valve plunger is polygonal in cross section, for example, triangular, the corners having a sliding fit with the walls of the air conduit 2 forming a guide for the plunger, also forming a series of longitudinal air passages, which in the aggregate present a large cross sectional area which allows free passage of air with minimum restriction. This portion of the plunger which has a sliding fit in the air passage always holds the plunger in perfect longitudinal alinement with the valve seat and maintains the cupped knife edge of the plunger in a transverse plane, parallel with the valve seat 5 so that when the valve plunger moves against the valve seat it closes evenly at all points and uniformly indents the seat thereby making a perfect airtight automatic closure. The lower end of the spring 13 rests upon a spring seat 16 which consists of a ring separable from the valve body 1 and held in place by friction, the friction being sufficient to hold it from displacement under all conditions of use. This construction obviates the use of two sizes of drills in order to form a shoulder for the spring and also enables the larger size drill to be used corresponding to the external diameter of the ring, also affords drilling to the center from one end and to the center from the other end. This is advantageous in manufacture because of the difficulty in boring the long air passage 2 with small drills.

17 designates the cap which is screwed on the externally threaded end of the valve body and carries a hollow pin 18, the latter being swiveled in the cap and having an externally tapered lower end 19 which when the cap is screwed down, wedges into the upper part of the opening in the fiber seat 6 and thus forms an additional closure which prevents leakage of air from the valve body, should the automatic valve mechanism for any reason fail to perfectly hold the air. It is important to know that this closure effected by the cap is at a point some distance within the outer end of the valve body and hence not liable to defacement as where such closure is made directly against the outer rim of the valve body. In use the fiber 6 and rubber 5 become attached together by automatic vulcanization and thus form virtually a unitary seat member. This seat member has three air closure points two of which are on the outer side opposing. These closure points are first, between the valve plunger 10 and rubber seat 5 and between the shoulder 4 and rubber seat 5 and between the hollow pin 18 and fiber 6. Whenever it is desired to remove the valve, the cap 17 having first been withdrawn, the sleeve 7 is then unscrewed, whereupon the seats 5, 6, readily slide out and the plunger 15 with attached spring 13 also slides out. Thus it will be seen that the automatic valve consists of a very few parts and these parts are slidable into or out of position.

What I claim is:

1. In a tire valve, a valve body, a valve seat in said body, said body having an air passage of uniform cross-section leading to the seat, a valve plunger slidable in said air passage toward and from said seat, a spring seat slidably secured by frictional contact in the uniform part of said air passage, and a spring between said seat and plunger.

2. In a tire valve, a valve body with an air passage having an enlarged outer bore, thereby forming an annular shoulder, a seat of yielding material resting against said shoulder, a seat retainer comprising a sleeve removably secured in the outer end of the valve body, and a seat of harder material than said yielding seat between the yielding seat and sleeve, and a valve plunger in the air passage movable against said yielding seat, said valve plunger having a pin at one end, said pin extending to the outer end of said valve body, and means below said pin adapted to guide said plunger.

3. In a tire valve, a valve body with an air passage having an enlarged outer bore thereby forming a shoulder, a perforated seat of yielding material resting against said shoulder, a sleeve removably secured in the enlarged bore, a washer between the sleeve and yielding seat, and a valve plunger in the air passage movable against the inner face of the yielding seat, said plunger below said seat having guiding means slidably fitting the wall of the air passage, and a pin secured to aid plunger, said pin extending to the outer end of said valve body.

4. In a tire valve, a valve body with an air passage and having an enlarged outer bore with a shoulder, a rubber seat on said shoulder, a seat composed of hard yielding material on the rubber seat, a sleeve screwed in the enlarged portion holding said material and rubber seats in position, a valve plunger in the air passage movable against the rubber seat, and means having a sliding fit with the wall of the air passage for guiding said plunger below said shoulder.

5. In a tire valve, a valve body with an air passage and having an enlarged outer bore with a shoulder, a rubber seat bearing against said shoulder, a sleeve screwed in the enlarged portion and retaining the seat, a valve plunger in the air passage, said valve plunger having a cupped end forming a thin edge adapted to seat against the rubber seat, said plunger having guide portions below said seat with a sliding fit in the air passage, a spring bearing against one end of the valve plunger to move it toward the rubber seat, and means in the valve body supporting the inner end of the spring.

6. In a tire valve, a valve body having an air passage with an enlarged bore forming a shoulder, a yielding seat on said shoulder, a seat retainer comprising a sleeve screwed in the enlarged bore for holding the yielding seat with an air-tight fit against said shoulder, the screw on said sleeve being limited and forming a stop to bring the inner end of the sleeve to a definite point.

7. In a tire valve, a valve body with an air passage and having an enlarged outer bore with a shoulder, a yielding seat in airtight engagement with said shoulder, a valve in the air passage movable against the inner side of said seat, an outer cap on the valve body, and a hollow pin carried by said cap and projecting into the enlarged bore, the inner end of said pin movable against the opposite side of the yielding seat.

8. In a tire valve, a valve body with an air passage, a removable flexible valve seat therein, a valve plunger movable against the inner side of the seat, a cap screwed on the end of the valve body, and a hollow pin revolubly carried by said cap, the inner end of the pin being beveled and movable against the flexible seat to form an airtight engagement with the seat.

9. In a tire valve, a valve body with an air passage having an enlarged outer bore, thereby forming an annular shoulder, a seat of yielding material resting against said shoulder, a seat retainer comprising a sleeve removably secured in the outer end of the valve body, a washer between the yielding seat and sleeve, a valve plunger in the air passage movable against said yielding seat, said valve plunger having a pin at one end, said pin extending to the outer end of said valve body, and means below said pin adapted to guide said plunger.

10. In a tire valve, a valve body with an air passage, a yielding valve seat therein, a metal valve plunger movable against the inner side of said seat, said valve plunger having a portion polygonal in cross section forming a plurality of air passages, a slidable spring seat frictionally retained in the air passage, and a spring between the spring seat and polygonal portion.

11. In a tire valve, a valve body with an air passage, a flexible seat removably secured in said air passage, a metal valve plunger movable against the inner face of said seat, said plunger having a boss on its inner end, a spring attached at its outer end to said boss, and a spring seat in said air passage and supporting the inner end of the spring, said plunger, between the boss and its outer end, having guide means.

12. In a tire valve, a valve body with an air passage, a yielding seat in said air passage, a valve plunger movable in the air passage against the inner face of said seat, a pin projecting from said valve plunger to a point near the outer end of the valve body, a cap on the valve body, and a hollow pin carried by said cap and slidably receiving said first pin, the inner end of said hollow pin being movable against the other side of the yielding seat to form an airtight closure.

13. In a tire valve, a body having an interior bore, a yielding valve seat within said bore and means for retaining said valve-seat in said bore, said means comprising a hollow sleeve fitting within said bore and adapted to press against said valve-seat, and a piece of stiff material between said sleeve and said yielding valve-seat.

14. In a tire valve, a body having an interior bore, a valve seat therein, a valve adapted to move against one side of said seat, and a cap having a projecting part adapted to contact with the other side of said seat, thus forming a second closure.

15. In a tire valve, a body having an interior bore, a valve seat therein, a valve adapted to move against one side of said seat, and a cap having a swivelled projecting part adapted to contact with the other side of said seat, thus forming a second closure.

In testimony whereof, I have hereunto set my hand at Los Angeles, California, this 11th day of February, 1913.

JUNIUS A. BOWDEN.

In presence of—
G. T. HACKLEY,
MARTHA M. LANGE.